Sept. 11, 1962 T. H. THOMASON 3,054,060

REVERSIBLE DECIMAL COUNTER

Filed Aug. 25, 1960 2 Sheets-Sheet 1

INVENTOR.
THOMAS H. THOMASON
BY
Louis J. Knobbe
ATTORNEY

Sept. 11, 1962 T. H. THOMASON 3,054,060

REVERSIBLE DECIMAL COUNTER

Filed Aug. 25, 1960 2 Sheets-Sheet 2

INVENTOR.
THOMAS H. THOMASON
BY Louis J. Knobbe
ATTORNEY 3,054,060

REVERSIBLE DECIMAL COUNTER

Thomas H. Thomason, Richmond, Calif., assignor to Beckman Instruments, Inc., a corporation of California Filed Aug. 25, 1960, Ser. No. 51,873
8 Claims. (Cl. 328—44)

Figure 1:
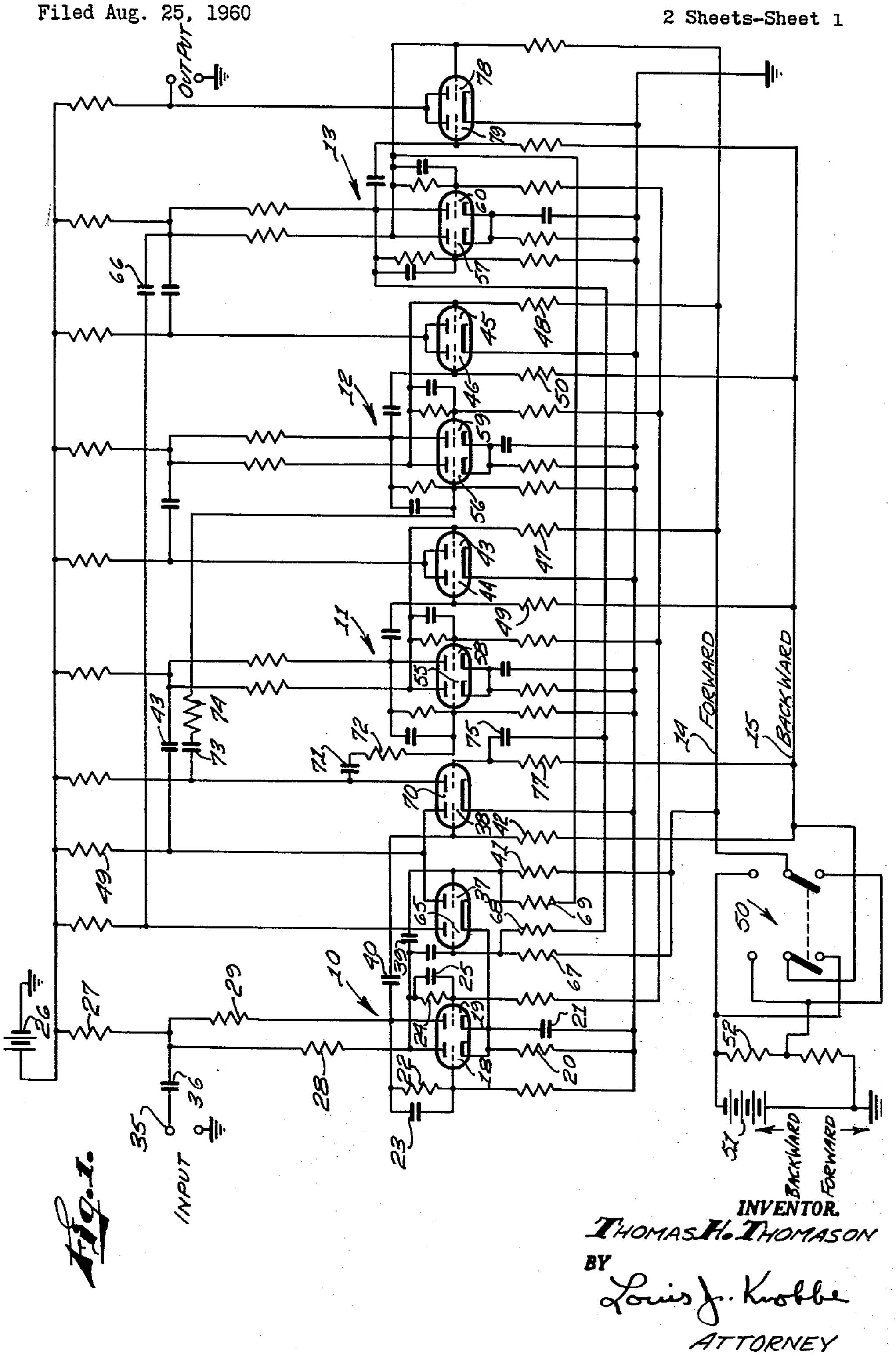

The present invention relates generally to decimal counter circuitry and, more particularly, to reversible decimal counters for counting in both forward and backward directions, i.e., for both adding and subtracting.

A type of decimal counter presently known in the art employs four binary stages appropriately series connected so that their respective states indicate a number encoded in binary coded decimal form. A convenient code is one in which the binary elements are weighted according to the 8-4-2-1 system. When so weighted, the necessarily concomitant binary representations for 10–15 inclusive have no meaning and steps must be taken to eliminate or correct these binary representations each time they occur in a counting operation. A convenient mode of operation for eliminating these unwanted representations, and the one preferred in the present invention, requires the binary stages to assume a zero count after a nine count when adding. That is to say, for operation in the forward direction each binary stage in the counter is placed in a zero state after a count of nine, whereupon the counter may begin another counting cycle. Thus, the normal sixteen bit capacity of a four-stage binary counter weighted 8-4-2-1 is attenuated to a capacity of ten bits. In subtracting, the preferred mode of operation is for the counter binary stages to assume a nine count following the zero count, whereupon the counter proceeds to count down from nine through zero. Again, the counter capacity has been attenuated to ten bits.

The prior art four-stage decimal counters provide either addition or subtraction of the input pulses but fail to provide a unitary four-stage decimal counter which provides the dual functions of both adding and subtracting. Such a reversible counter is desirable not only for its apparent convenience, but also because of the reduction in cost permitted by the dual utilization of the binary elements. The reduction in number of circuit elements would not only lower the cost of manufacture, but also would result in more trouble-free operation.

Accordingly, it is the primary object of this invention to provide a reversible decimal counter employing a minimum number of circuit components.

It is another object of this invention to provide a decimal counter of only four binary stages which both adds and subtracts.

Other and further objects, features and advantages of the invention will become apparent as the description proceeds.

Briefly, in accordance with a preferred form of the present invention, a reversible decimal counter comprises four bistable multivibrator circuits hereinafter referred to in equivalent fashion as "flip-flops" "binary stages" or "binaries." Each flip-flop has first and second outputs exhibiting mutually exclusive states. Adjacent ones of these stages are interconnected to form a series of binary stages weighted according to the normal binary or 8-4-2-1 system. For adding, one of the outputs of each stage is electrically connected to an adjacent series connected stage so as to pass carry pulses thereto, while for subtracting the other output of each stage is electrically connected to an adjacent stage so as to pass carry pulses thereto. In order to permute the four-stage binary counter to count in the desired decimal system, additional current conductive circuits are provided. For forward counting, a first circuit connects the output of the "1" stage to the input of the "8" stage and a second circuit connects the output of the "8" stage to the input of the "2" stage. At the eighth input pulse during forward counting or addition, the state of the "8" stage changes from its binary "0" to its binary "1" state at which time a biasing potential is fed back through the second circuit to the "2" stage to prevent the next carry pulse from the "1" stage (generated at the tenth input pulse) from triggering the "2" stage. The first circuit causes the "8" stage to be returned to its "0" state at the tenth input pulse. For backward counting or subtraction, a third circuit connects an output of the "8" stage to the inputs of the "2" and the "4" stages. With all stages in the binary "0" state, the first impulse actuates the "1" stage which, in turn, applies a carry pulse to the input of the "2" stage. In turn, the "2" stage triggers the "4" stage and the "4" stage triggers the "8" stage. The third circuit then feeds back to pulse to the "4" and the "2" stages and triggers both to their original or binary "0" state so that a decimal count of nine is registered by the counter. The succeeding input pulses serve to consecutively count from 8 to zero.

Figure 2:
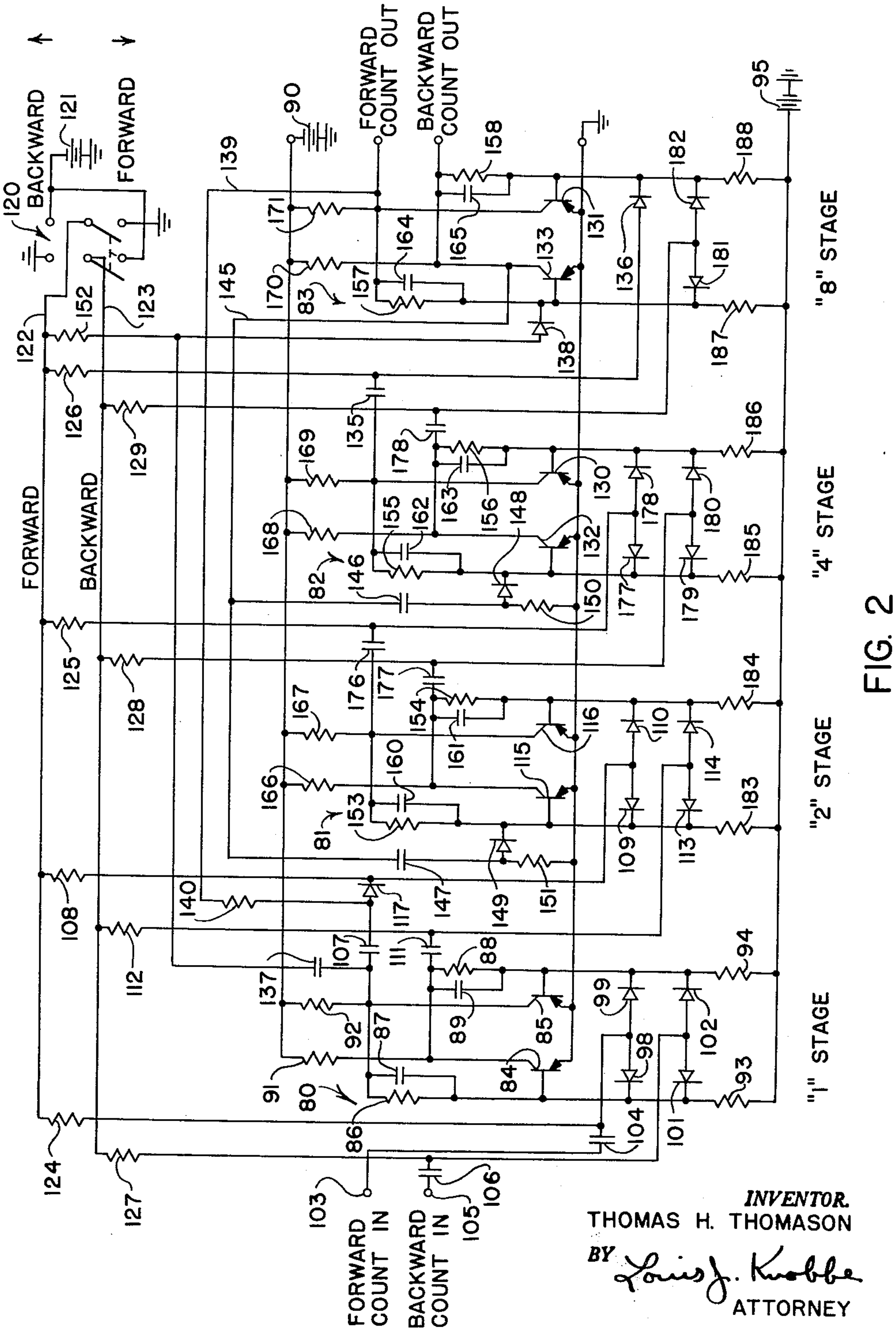

A more thorough understanding of this invention may be obtained by a study of the following detailed description taken in connection with the accompanying drawings in which:

FIG. 1 is a schematic of the circuitry employed in one embodiment of this invention; and FIG. 2 is a schematic of an alternate preferred embodiment of this invention.

In FIG. 1 there is shown according to the invention a reversible decimal counter comprising four binary stages 10, 11, 12 and 13, the interconnections of which are controlled to achieve the desired mode of counting. Either an "add" or "subtract" mode is selected by the application of suitable voltages to the two control lines 14 and 15 which are respectively labeled "Forward" and "Backward." A positive pulse applied to the input terminal 35 will cause the counter to count in a direction set by the control lines. While the counter shown in FIG. 1 utilizes vacuum tubes, counters may be constructed in accordance with this invention employing transistors, one embodiment of which is shown hereinafter.

Each of the binary stages comprises a pair of vacuum tube triodes such as triodes 18 and 19 of the binary stage 10. For convenience and economical utilization of space, a dual triode is preferred in which the two triodes are enclosed within a single glass envelope as shown in FIG. 1. These triodes are connected in a well-known manner to provide a flip-flop circuit in which each triode is maintained in the respectively opposite state in the absence of a triggering input signal. The grid of tube 18 is connected to the plate of tube 19 through a cross-coupling connection comprising the parallel combination of resistor 22 and capacitor 23. In similar manner the grid of tube 19 is connected to the plate of tube 18 through a cross-coupling connection comprising parallel connected resistor 24 and capacitor 25. The cathodes of triodes 18 and 19 are connected together to ground through a grid biasing R-C circuit comprising resistor 20 and capacitor 21. A positive potential from the direct current source 26 is supplied to the anodes of the triodes through common resistor 27 and anode coupling resistors 28 and 29 respectively connected to the plates of the triodes 18 and 19. Negative input trigger pulses are applied between the input terminal 35 and ground. Terminal 35 is connected to the common terminal of the anode resistors 28 and 29 through an input coupling capacitor 36.

In operation, if it is assumed that the triode 19 is initially conducting, the other triode 18 will be cut off. A negative pulse applied to the input terminal 35, will appear on the plate of the tube 18 and on the grid of the conducting tube 19 which will in turn reduce conduction of the latter tube. This, in turn will make the potential on the anode of triode 19 more positive, and degenerate simultaneously any of the original negative pulse applied at this plate. Thus, a positive pulse will be applied to the grid of tube 18 causing this tube to become conducting. This effect will increase, because of the difference in the potential charges on the cross-coupling capacitors 23 and 25, until the originally conducting tube 19 is cut off, and the originally nonconducting tube 18 becomes completely conducting. A subsequent negative pulse supplied to the input terminal 35 will cause the stable condition of the trigger tubes 18 and 19 to be reversed since the circuit is completely symmetrical.

The outputs of binary stage 10 are taken from the plates of triodes 18 and 19. Stage 10 represents a binary "0" when the right-hand triode 19 is conducting and the left-hand triode 18 is cut off. In this state, the plate of triode 19 is substantially lower in potential than the plate of triode 18. A change of state of binary stage 10 causes a reversal of these potential levels; this change in potential of the plates results in a voltage step function having either a positive or negative wave front.

Binary stages 11, 12 and 13 are constructed in a substantially identical manner to that of binary stage 10, each including a pair of triodes forming a bistable multivibrator. Adjacent ones of these stages are interconnected to form a series of binary stages so that each stage is weighted according to the normal binary or 8-4-2-1 system. Other circuits permute the normal binary code to the desired decimal code as hereinafter described.

A representative coupling circuit between binary stages interconnects binary stage 10 and succeeding binary stage 11. This circuitry comprises triodes 37 and 38 each of which form half of a dual triode. The other triodes included within the envelopes comprise additional circuits for permuting the counter to the decimal code and are described hereinafter. The plates of triodes 37 and 38 are coupled together through a common resistor 49 to the anode supply voltage. The cathode of triode 37 is connected to the cathodes of triodes 18 and 19 while the cathode of triode 38 is connected directly to ground. The grids of triodes 37 and 38 are connected to respective outputs of binary stage 10 by connecting the grid of triode 37 to the plate of triode 18 and the grid of triode 38 to the grid of triode 19 through respective coupling capacitors 39 and 40. The plates of triodes 37 and 38 are connected to the input of binary stage 11 by a coupling capacitor 43. In similar manner, the respective outputs of binary stage 11 are connected to the input of succeeding binary stage 12 by triodes 43 and 44 and the respective outputs of binary stage 12 connected to the input of succeeding binary stage 13 by triodes 45 and 46.

The counter shown in FIG. 1 counts in a forward or backward direction depending upon which side of each binary stage is permitted to transmit a carry pulse to the immediately suceeding binary stage. This control is provided by biasing the grid of the intercoupling triode, coupled to the unwanted binary stage output, sufficiently negative so that these triodes will not be driven out of cutoff when a positive voltage pulse is received from a preceding binary stage. Those triodes connected to the desired binary stages are biased such that they will be driven out of cutoff by a positive voltage pulse received from a preceding binary stage. These control biasing voltages are provided by double-throw double-pole switch 50 which selectively connects forward control line 14 and backward control line 15 to two different negative bias levels provided by battery 51 and potentiometer 52.

Forward control line 14 is connected to the grids of intercoupling triodes 37, 43 and 45 through respective resistors 41, 47 and 48. The grids of these intercoupling triodes are also connected to the plates of respective left-hand triodes in binary stages 10, 11 and 12. Backward control line 15 is connected to the grids of intercoupling triodes 38, 44 and 46 through respective resistors 42, 49 and 50. The grids of these intercoupling triodes are also connected to the plates of respective right-hand triodes in binary stages 10, 11 and 12.

The count registered in the counter decade may be determined in a well-known manner by noting the respective states of each of the binary states. For example, a simple readout may comprise four neon bulbs (not shown) respectively connected to the plate circuits of the right-hand triodes. In the "0" state, these triodes are conducting and their plate potential will not be sufficient to fire the neon bulbs; in the "1" state, these triodes are cut off and the resultant increase in plate potential is sufficient to fire the neon bulbs. The respective On and Off states of each of the lamps denote the value recorded in the counter in accordance with the table, infra. Somewhat more complex readout devices are known in the art wherein ten neon bulbs are connected to the binary stages by suitable logic circuitry and are lit one at a time to indicate the digits registered in the counter.

The operation of the binary counter of FIG. 1 will now be described. Consider first the conditions for forward or additive counting. The full negative potential of the source 51 is applied to the backward control line 15 by throwing the double-throw double-pole switch 50 to the lower or Foward position, as shown in FIG. 1. A portion of the bias potential is then applied to the forward control line. Accordingly, each of the intercoupling triodes coupled to the backward control line by respective coupling resistors are biased so that they will not be driven out of cutoff by a positive pulse received from a preceding binary stage. These triodes are connected to the plates of the right-hand triodes of each binary stage, e.g., triode 19 of binary stage 10. Each of the intercoupling triodes coupled to the forward control line by the respective coupling resistors are biased so that they will be driven out of cutoff by a positive pulse received from a preceding binary stage. These triodes are connected to the plates of the left-hand triodes of each binary stage, e.g., triode 18 of binary stage 10. Thus, the carry pulses from the output of each transistor stage to a succeeding stage are generated only at the plate electrode of a left-hand triode in each stage.

For a representation of "0" count on the decimal counter of FIG. 1, right-hand triodes 19, 53, 59 and 60 are conducting current and are considered to be in the On state. Correlatively, triodes 18, 55, 56 and 57 are cutoff and are considered to be in the Off state. Each of the binary stages 10, 11, 12 and 13 is then considered to be in its binary "0" state.

A first input pulse negative in polarity, applied to the input terminal 35 will cause binary stage 10 to change to its binary "1" state. No output signal will be transmitted at this first input pulse since the plate of triode 18 changes from a higher to a lower positive potential. The voltage step at the plate of triode 18 when stage 10 changes state is differentiated by capacitor 39 and resistor 41. Resistor 41 thus serves both to conduct biasing potential to the grid of intercoupling triode 37 and, in combination with capacitor 39, differentiate interstage carry pulses. The resultant negative pulse output of binary stage 10 at the first input pulse is of the reverse polarity for causing intercoupling triode 37 to be driven out of cutoff. The second input pulse applied to binary stage 10 through input terminal 35 will again trigger the stage and the plate potential of triode 18 will return from the lower to the higher positive potential thus generating a positive voltage step. This step is differentiated and the resultant positive pulse is applied to the grid of intercoupling triode 37. Triode 37 is then driven out of cutoff and produces a negative voltage step at the input of capacitor 43 connected to the input of binary stage 11. Binary stage 11 is then caused to trigger to its binary "1" state.

The second input pulse was seen above to trigger the second binary stage 11. In turn, the fourth input pulse will generate a carry pulse from the "2" stage 11 to the "4" stage 12 and trigger the latter stage. Likewise, the eighth input pulse will generate a carry pulse from the "4" stage 12 to the input of the "8" stage, and causes this stage to change to its binary "1" stage. Up to and including the ninth input pulse, the counter of this invention in the forward direction operates exactly as a pure binary counter. However, upon receipt of the tenth input pulse, the pure binary system must be modified to the 8-4-2-1 decimal system for counting in the decimal system. The necessary operation of a four-stage binary decimal counter employing the 8-4-2-1 is tabulated below for both the add and subtract modes of operation.

| Pulse Order | Add | | | | | Subtract | | | | |
|---|---|---|---|---|---|---|---|---|---|---|
| | Stage | | | | Decimal Number | Stage | | | | Decimal Number |
| | "1" | "2" | "4" | "8" | | "1" | "2" | "4" | "8" | |
| 0 | 0 | 0 | 0 | 0 | 0 | 0 | 0 | 0 | 0 | 0 |
| 1 | 1 | 0 | 0 | 0 | 1 | 1 | 0 | 0 | 1 | 9 |
| 2 | 0 | 1 | 0 | 0 | 2 | 0 | 0 | 0 | 1 | 8 |
| 3 | 1 | 1 | 0 | 0 | 3 | 1 | 1 | 1 | 0 | 7 |
| 4 | 0 | 0 | 1 | 0 | 4 | 0 | 1 | 1 | 0 | 6 |
| 5 | 1 | 0 | 1 | 0 | 5 | 1 | 0 | 1 | 0 | 5 |
| 6 | 0 | 1 | 1 | 0 | 6 | 0 | 0 | 1 | 0 | 4 |
| 7 | 1 | 1 | 1 | 0 | 7 | 1 | 1 | 0 | 0 | 3 |
| 8 | 0 | 0 | 0 | 1 | 8 | 0 | 1 | 0 | 0 | 2 |
| 9 | 1 | 0 | 0 | 1 | 9 | 1 | 0 | 0 | 0 | 1 |
| 10 | 0 | 0 | 0 | 0 | 0 | 0 | 0 | 0 | 0 | 0 |

The additional intercoupling circuits for achieving a decimal operation in both the additive and subtractive operational modes are as follows: For forward counting operation, an additional circuit is provided between the output of the "1" stage and the input of the "8" stage comprising intercoupling triode 65 and capacitor 66. The grid of triode 65 is connected to the plate of left-hand triode 18. Triode 65 is normally held cutoff by the voltage determined by voltage dividing resistors 67 and 68 connected in series between the forward control line 14 and the plate of the right-hand triode 60 of binary stage 13. When binary stage 13 is in its binary "0" state, the plate of triode 60 will be at a depressed voltage level thereby lowering the voltage applied to the grid of triode 65 which is connected at the junction of resistors 67 and 68. The grid of intercoupling triode 37 is connected between the midpoint of resistors 41 and 69. These resistors are connected in series between the forward control line and the plate of the left-hand triode 57 of binary stage 13. When binary stage 13 is in its binary "0" state the plate of triode 57 is at a high positive potential; and therefore, the potential seen by the grid of triode 37 is just slightly below cutoff so that this tube is operative as the pulse coupler heretofore described. When, however, the state of binary stage 13 is reversed to its binary "1" state, the respective potentials applied to intercoupling triodes 37 and 65 are reversed so that triode 37 is biased so that it will never be driven out of cutoff whereas the opposite is true of triode 65. Hence, upon the tenth input pulse, the positive voltage pulse originating at the plate of triode 18 causes triode 65 to be driven out of cutoff. A negative voltage step is then conducted through capacitor 66 to the input of binary stage 13 to reverse this stage to its binary "0" state, while no carry pulse is allowed to pass through the intercoupling triode 37. As a result, the binary stage 2 is unaffected by the tenth input pulse and remains in its binary "0" state. The tenth input pulse thus causes the decimal counter to represent the desired zero count by triggering the "1" and "8" stage which were in their binary "1" state and not triggering the "2" and "4" stages already in their binary "0" state.

For backward counting or subtraction with the circuitry of FIG. 1, switch 53 is placed in the upper or backward position thus connecting the forward control line 14 to the full potential of the bias source 51 and the backward control line 15 to only a portion of the potential of the bias source 51. With the stated control voltages, the intercoupling triodes coupled to the left-hand triode of each binary stage, e.g., triode 18 of stage 10, are biased so that a positive pulse input will not drive them out of cutoff. Thus, carry pulses between the stages can only be generated by the plate circuits of the right-hand triodes 19, 58, 59 and 60. With each of the flip-flops returned to the binary "0" state, the "1" stage 10 is triggered by application of a first negative pulse to the input terminal 35. The plate of triode 19 is thereupon caused to rise in potential thus causing a positive pulse to appear at the grid of intercoupling triode 38. Triode 38 is then driven out of cutoff and causes a negative pulse to appear at the input of binary stage 11. This second binary stage in turn generates a carry pulse through intercoupling triode 44 to the input of the "4" stage 12. This latter stage triggers and generates a carry pulse through intercoupling triode 46 to the input of the "8" stage 13 which triggers in turn. As shown in the table tabulated hereinbefore, in a binary decimal counter a count of zero in a subtracting sequence must be succeeded by a count of nine. This is accomplished by an additional circuit comprising intercoupling triode 70, series connected capacitor 71 and resistor 72 and series connected capacitor 73 and resistor 74. The grid of triode 70 is connected to the plate of triode 60 through capacitor 75. The positive voltage step of the plate of triode 60 at the first input pulse during a subtraction sequence is differentiated by capacitor 75 and resistor 77. The resultant positive pulse drives triode 70 which in turn triggers the "2" stage 11 and the "4" stage 12 via the respective series circuits connected between its plate and the inputs of these stages. Only the "1" and the "8" stages 10 and 13 are then left in their binary "1" stage. By reference to the table above it will be apparent that the first count has achieved the desired count of nine.

The secondary input pulse applied to the first binary stage 10 through the input terminal 35 causes only the first binary stage 10 to trigger, since a positive carry pulse is not generated when triode 19 is changed from its Off to its On state. The third input pulse triggers the first binary state 10 which generates a carry pulse. This pulse triggers the secondary binary stage or "2" stage 11 which in turn generates a carry pulse. The third binary stage or "4" stage 12 is triggered thereby and in turn generates a carry pulse which is applied to the fourth binary stage or "8" stage 13. The "8" binary stage is thus triggered to its initial binary "0" state condition and remains in that state for the duration of the decade count. With this change of state of binary stage 13, a positive pulse is not applied to the grid of intercoupling triode 70 since the plate of triode 60 is lowered in potential. Thus, the first, second and third binary stages 10, 11, 12 are left in their binary "1" states for the desired count of 7 as denoted by the table of FIG. 2. The succeeding seven input pulses trigger the first three binaries in turn, reducing the stored count each time by one count until a zero count is reached at the tenth input pulse.

The additional circuits enabling a decimal count will not interfere with each other when adding or subtracting. In the forward counting mode, intercoupling triode 70 (used in the backward counting mode) is connected to the backward control line 15 by resistor 77 so that it will never be driven out of cutoff. Thus, no erroneous pulses can be applied to the "2" stage 11 or the "4" stage 12 by this coupling stage during a forward count. In the backward counting mode, the grid of intercoupling triode 65 (used in the forward counting mode) is connected to the forward control line 14 and it likewise will remain cutoff during the entire backward counting sequence.

Although in the operation described above it has been assumed for ease of explanation that the counting stages were initially in their binary "0" state prior to both forward and backward counting it will be understood that a reversal of counting from either adding to subtracting or subtracting to adding may be made with any predetermined count being represented by the counter.

It will be further understood that several of the four-stage binary decimal counters such as are shown in FIG. 1 may be cascaded so as to count to the required number of decimal digits. Thus, the plates of triodes 57 and 60 of binary stage 13 are connected to the respective grids of intercoupling triodes 78 and 79. The common plate connection of these triodes serves as the output of the counter of FIG. 1 and may be connected to the input of a succeeding counter. Likewise, input terminal 35 may be connected to the output of a preceding counter.

Another and preferred embodiment of this invention is illustrated in FIG. 2. A decimal counter shown in this figure comprises four transistorized binary stages 80, 81, 82 and 83. The intercoupling connections in this embodiment likewise do not utilize vacuum tubes; rather, gating circuitry utilizing semiconductor diodes is provided. The circuitry of these intercoupling circuits is the invention of Hamilton C. Chisholm et al. and is disclosed and claimed in the copending application Serial No. 51,970, entitled "Reversible Decimal Counter," filed August 25, 1960, and assigned to Beckman Instruments, Inc., assignee of the present invention. The counter shown and described uses p-n-p type transistors which require supply voltages as indicated and which work in conjunction with the diodes, the polarity of which is orientated to the supply voltages. The counter can be made to function equally well with n-p-n type transistors in which case the supply voltages and diode polarities are reversed.

Each of the binary stages comprises a pair of transistors, such as transistors 84 and 85 of binary stage 80. These transistors are connected in a well-known manner to provide a flip-flop in which each transistor is maintained in the respectively opposite state. The emitter electrodes of transistors 84 and 85 are connected together at ground. The base electrode of transistor 84 is connected to the collector electrode of transistor 85 through a cross-coupling connection comprising parallel connected resistor 86 and capacitor 87. In a similar manner, the base electrode of transistor 85 is connected to the collector electrode of transistor 84 through a cross-coupling connection comprising parallel coupled resistor 88 and capacitor 89.

Direct current power to binary stage 80 is supplied by a suitable source 90 having a positive terminal connected to ground and a negative terminal connected through a resistor 91 to the collector electrode of transistor 84 and through resistor 92 to the collector electrode of transistor 85. To complete the direct current biasing circuit, the base electrode of transistor 84 is returned to a positive potential source 95 through a resistor 93, and the base electrode of transistor 85 is returned to positive potential source 95 through a resistor 94.

The output signals of binary stage 80 are taken from the collector electrodes of transistors 84 and 85. Stage 80 represents a binary "0" when the right-hand transistor 85 is conducting and the left-hand transistor 84 is nonconducting. In this state, the collector electrode of transistor 85 is approximately at ground potential while the collector electrode of transistor 84 is at substantially the negative potential of source 90. A change of state of binary stage 80 causes a reversal of these potential levels; this change in potential of the collector electrodes results in a voltage step having either a positive or a negative wave front.

Binary stages 81, 82 and 83 are constructed in a substantially identical manner to that of binary stage 80, each including a pair of transistors forming a bistable multivibrator. As shown in FIG. 2, binary stage 81 comprises transistors 115 and 116; resistors 153, 154, 166, 167, 183 and 184; and capacitors 160 and 161; binary stage 82 comprises transistors 130 and 132; resistors 155, 156, 168, 169, 185 and 186; and capacitors 162 and 163; and binary stage 83 comprises transistors 131 and 133; resistors 157, 158, 170, 171, 187 and 188; and capacitors 164 and 165. Adjacent ones of these stages are interconnected to form a series of binary stages weighted according to the normal binary or 8-4-2-1 system. Thus, binary stage 80 is the "1" stage, binary stage 81 is the "2" stage and binary stages 82 and 83 are the "4" and "8" stages respectively. Other circuits hereinafter described permute the normal binary code to the desired decimal code.

A representative intercoupling circuit constructed in accordance with the H. C. Chisholm et al. application, supra, interconnects binary stage 80 and the adjacent succeeding stage 81 and includes a first selective pulse conducting means comprising capacitor 107 and resistor 108 as a differentiating circuit and diodes 109, 110 as a gating means. Similarly, a second selective pulse conducting means comprises capacitor 111 and resistor 112 as a differentiating circuit and diodes 113, 114 as a gating means. The first selective pulse conducting means is connected to the output of the right-hand transistor 85 by connecting capacitor 107 to the collector electrode of transistor 85 while the second selective pulse conducting means is connected to the output of the left-hand transistor 84 by connecting capacitor 111 to the collector electrode of transistor 84. Diode 117 is also series connected between capacitor 107 and diode pair 109, 110; its function will be described hereinafter.

Diodes 109 and 110 have a common anode connection and have their cathodes respectively connected to the base electrodes of transistors 115 and 116 of the "2" binary stage. Likewise, diodes 113 and 114 have a common anode connection and have their cathodes respectively connected to the base electrodes of transistors 115 and 116. As noted above, these diodes comprise selective pulse conducting means. Also, these diodes operate as "steering" diodes and permit independent triggering of each of the transistors 115 and 116 through a common connection.

The counter shown in FIG. 2 counts in a forward or backward direction depending upon which side of each stage is permitted to transmit a carry pulse to the succeeding binary stage. This control is provided by back biasing the steering diode pair which is coupled to the unwanted binary stage output. For this purpose, double-throw double-pole switch 120 selectively grounds or connects to direct current source 121 forward control line 122 and backward control line 123. Source 121 may be a separate source as shown, or may be supplied from source 90. For forward counting, switch 120 is in its lower position and a negative voltage is applied to the backward control line 123 while forward control line 122 is connected to electrical ground. For backward counting switch 120 is in its upper position and negative supply voltage is applied to the forward control line 122 and ground potential to the backward control line 123. Forward control line 122 is connected to each of the steering diode pairs coupled to a right-hand transistor of each binary stage, e.g., transistor 85 of binary stage 80, by respective resistors 124, 108, 125 and 126. Backward control line 123 is connected to each of the steering diode pairs coupled to a left-hand transistor of each binary stage, e.g., transistor 84 of binary stage 80, by respective resistors 127, 112, 128 and 129. Resistors 108, 112, 124–129 thus serve both to conduct biasing potentials to the intercoupling diodes and, in combination with intercoupling capacitors, differentiate interstage carry pulses. It will be apparent that the negative potential applied to the anodes of a selected steering diode pair will back bias these diodes thereby preventing the transmission therethrough of a carry pulse to the input of its associated binary stage.

The count registered in the counter decade is determined by noting the respective states of the binary stages. A preferred indicating readout display provides ten neon bulbs connected to the binary stages according to the teachings of Hamilton C. Chisholm in Patent No. 2,843,320 entitled "Transistorized Indicating Decade Counters" and assigned to the assignee of the present invention. When so connected, the neon bulbs are lit one at a time to display the value of the digit registered by the counter decade.

The operation of the binary counter of FIG. 2 is quite similar to the counter of FIG. 1. Consider first the conditions for forward or additive counting. A source of negative potential 121 is applied to the backward control line 122 by throwing the double-throw double-pole switch 120 to the lower position shown in FIG. 2. Accordingly, each of the steering diode pairs coupled to the backward control line by the respective coupling resistors are back biased, e.g., diodes 113 and 114 connected to the input of binary stage 81. These reverse biased diode pairs are capacitively connected to the collector electrodes of the left-hand transistors, e.g., transistor 84 of binary stage 80. Therefore, the carry pulses from the output of each transistor stage to its adjacent stage are passed only from the collector electrode of a right-hand transistor in each stage.

For a representation of "0" count on the decimal counter of FIG. 2, right-hand transistors 85, 116, 130 and 131 are conducting current and are considered to be in the On state. Correlatively, transistors 84, 115, 132 and 133 are in a substantially nonconducting state and are considered to be in the Off state. Each of the binary stages 80, 81, 82 and 83 is then considered to be in its binary "0" state.

A first input pulse, positive in polarity, applied to the forward input terminal 103 will be transmitted through both of the steering diodes 98 and 99 causing the base electrode of transistor 85 to become substantially more positive than the emitter electrode potential, thus resulting in a cessation of current conduction through transistor 85. The potential of its collector electrode is changed to substantially that of the negative terminal of source 90 due to a cessation of current flow through resistor 92. A drive current is then transmitted through cross-coupling resistor 86 and capacitor 87 to the base electrode of transistor 84 resulting in transistor 84 being placed in its conducting condition. The respective states of the transistor have thus been reversed and will so remain until another trigger pulse is received at the input of binary stage 80. No output signal will be transmitted at this first input pulse since the collector electrode of transistor 85 changes from substantially ground potential to a negative potential. This negative step differentiated by capacitor 107 and resistor 108 is of the reverse polarity for transmission through steering diodes 109 and 110. The second input pulse applied to binary stage 80 through forward input terminal 103 will again trigger this stage and the collector potential of transistor 85 will return to ground potential thus generating a positive voltage step. This step is differentiated by capacitor 107 and resistor 108 and the resulting pulse is coupled to the input of binary stage 81 through steering diodes 109 and 110 thereupon causing binary stage 81 to trigger to its binary "1" state.

The second input pulse was seen above to trigger the second binary stage 81. In turn, the fourth input pulse will generate a carry pulse from the "2" stage 81 to the "4" stage 82 and trigger the latter stage. Likewise, the eighth input pulse will generate a carry pulse from the "4" stage 82 through the differentiating circuit comprising capacitor 135 and resistor 126 to the anode of single diode 136. The cathode of diode 136 is conencted to the input base electrode of transistor 131. A pair of diodes is not required for coupling the carry pulse to the input of the last stage 83 for reasons stated hereinafter. The positive pulse applied to the base of transistor 131 when stage 83 is in the binary "0" state, causes this stage to change to its reverse stable state and thus register a binary "1" upon the eighth input pulse. Up to and including the ninth pulse the counter shown in FIG. 2 in the forward direction operates exactly as a pure binary counter. However, upon receipt of the tenth input pulse, the pure binary system must be modified to the 8-4-2-1 binary decimal system for counting in the decimal system. The necessary operation of a four-stage binary decimal counter employing the 8-4-2-1 system has been heretofore tabulated.

The addition circuitry for achieving a decimal operation in both the additive and subtractive operational modes is as follows. For forward counting operation, the additional circuit provided between the output of the "1" stage and the input of the "8" stage includes a differentiating circuit (comprising capacitor 137 and resistor 152) and diode 138 series connected between the output collector electrode of transistor 85 and the input base electrode of transistor 133. This additional circuit transmits a carry pulse from the output of the "1" stage to the input of the "8" stage upon application of the tenth input pulse. The "8" stage is then triggered and returns to the required binary "0" state for registering a decimal count of ten. This additional circuit provides the necessary input for reversing the "8" stage 83 back to its binary "0" state. Therefore, no steering diode is required to be connected between the output of the "4" stage 82 and the input base electrode of transistor 133.

One additional manipulation is required in order that a zero count be represented upon application of the tenth input pulse. That is, that the "2" stage 81 must be prevented from changing state due to the carry pulse originating from the "1" stage 80 upon application of the tenth input pulse. This function is provided by the additional circuit connected between the output of the "8" stage and the input of the "2" stage comprising connecting line 139, diode 117 and resistor 140. When transistor 131 is turned Off at the eighth input pulse, its collector electrode assumes a negative potential. This negative potential is applied through connecting line 139 and reverse biases diode 117, thereby effectively blocking any carry pulse from the "1" stage 80 to the "2" stage 81. At the tenth input pulse, a carry pulse does result and is blocked before it reaches the "2" stage. Thus, the "2" stage 81 remains in the binary "0" state. The "4" stage 82, having already been in the binary "0" state, remains therein. The tenth input pulse thus causes the decimal counter to represent the desired zero count by triggering the "1" and "8" stages which were in their binary "1" state and not triggering the "2" and "4" stages already in their binary "0" state.

For backward counting or subtraction with the circuitry of FIG. 2, switch 120 is placed in the Backward position thus connecting the forward control line 122 to the negative potential of battery 121 and connecting the backward control line 123 to electrical ground. With the stated control voltages, the steering diodes coupled to the right-hand transistor of each stage, e.g., transistor 85 of stage 80, are reverse biased and carry pulses between the stages can only be generated by the collector circuits of the left-hand transistors 84, 115, 132 and 133. With each of the transistor flip-flops returned to their binary "0" state, the "1" stage 80 is caused to trigger by application of a first positive pulse to the ackward input terminal 105. The collector of transistor 84 is thereupon caused to change potential from substantially negative supply voltage to substantially ground potential thus causing a positive pulse to appear at the anodes of steering diodes 113 and 114. This carry pulse from the "1" stage 80 to the "2" stage 81 triggers the second binary stage in turn causing this stage to generate a carry pulse. In turn, the "4" stage 82 triggers and generates a carry pulse which in turn triggers the "8" stage 83. As shown in the table tabulated hereinbefore, in a binary decimal counter, a count of zero in a subtracting sequence must be succeeded by a count of nine. This is accomplished by additional circuits comprising connecting line 145 connected between the collector electrode of transistor 133 and one side of capacitors 146 and 147. The other side of capacitor 146 is connected to the base electrode of transistor 132 through diode 148 and the other side of capacitor 147 is connected to the base electrode of transistor 115 through diode 149. Diodes 148 and 149 are poled so that their anodes are connected to the respective capacitor and their cathodes are connected to the respective transistor base. A positive pulse will be transmitted therethrough to the respective transistor base. Resistors 150 and 151 are respectively connected between the anodes of diodes 148 and 149 and ground.

On the first input pulse as aforementioned, the "8" binary stage 83 is triggered from its binary "0" to its binary "1" stage. The collector electrode of transistor 133 then changes from substantially negative power supply voltage to substantially ground potential and supplies a positive step potential through line 145. This positive potential is differentiated by the respective resistor-capacitor combinations of capacitor 146, resistor 150 and capacitor 147, resistor 151 and the resulting positive pulse is gated through diodes 148 and 149 causing both the "2" and the "4" binary stages to retrigger to their binary "0" states. Only the "1" and "8" stages 80 and 83 are then left in their binary "1" state. By reference to the table above it will be apparent that the first count has achieved the desired count of nine.

The second input pulse applied to the first binary stage 80 through the backward input terminal 105 causes only the first binary stage 80 to trigger since a positive carry pulse is not generated when the transistor 84 is changed from its On to its Off state. The third input pulse triggers the first binary stage 80 which generates a carry pulse. This pulse triggers the second binary stage or "2" stage 81 which in turn generates a carry pulse. The third binary stage or "4" stage 82 is triggered thereby and it in turn generates a carry pulse which is applied to the fourth binary stage or "8" stage 83. The "8" binary stage is thus triggered to its initial binary "0" state and remains in that state for the duration of the decade count. With this change of state of binary stage 83, a positive pulse is not transmitted over line 145 since the collector electrode of transistor 133 changes from a substantially ground potential to substantially negative power supply potential. Thus, the first, second and third binary stages 80, 81 and 82 are left in their binary "1" states for the desired count of seven as denoted by the table of FIG. 2. The succeeding seven input pulses trigger the first three binaries in turn, reducing the stored count each time by one count until a zero count is reached at the tenth input pulse.

The additional circuits enabling the decimal counter of FIG. 2 do not interfere with each other when adding or subtracting. In the forward counting mode, connecting line 145, capacitors 146 and 147 and diodes 148 and 149 (used in the subtracting counting mode) continue to feed back a positive pulse to the "2" and the "4" stages when the "8" stage changes from a binary "0" to a binary "1" state (at the eighth input pulse when adding). This positive pulse is applied to the base electrodes of nonconducting transistor 115 of the "2" stage 81 and nonconducting transistor 132 of the "4" stage 82 and tends to more strongly reverse bias their emitter to base junctions. Transistors 115 and 132 thus remain Off and stages 81 and 82 are unchanged. In the backward counting mode, diode 138 (used in the forward counting mode) is reverse biased by the negative potential of control line 122 connected thereto through resistor 152. Thus no carry pulses are transmitted through this diode during subtraction. Connecting line 139 and diode 117 (also used in the forward conducting mode) is connected to the output of the right-hand transistor 85 of stage 80. Since carry pulses from this side of binary stage 80 are not used during subtraction, any blocking thereof has no effect on the reverse counter operation. Resistance 67 and conductor 57 connected between the collector electrode of transistor 52 and the anode of diode 56 (also used in the forward counting mode) do not transmit an erroneous carry pulse from the "1" stage 10 to the forward output terminal 130 in either the forward or backward counting modes. For eight counts out of ten during both forward and backward operation, the output transistor 52 is On and effectively grounds the output terminal. In forward operation the tenth input would generate a positive voltage step from 19. This step, however, triggers binary 13 through capacitor 60, and the output 130 is driven positive essentially in synchronism with the triggering of binary 10. In reverse operation, the "8" stage is triggered on the first input along with the "1" stage. The second input generates a positive step from transistor 19 which is coupled to the output 130 through capacitor 38 and resistor 67. However, the forward control is now negative and the differentiated step is attenuated through diode 56 and resistor 42. In addition, resistors 67 and 90 act as a voltage divider and greatly reduce the voltage appearing at the output.

By way of illustration only, the following specific values are given as typical of those which may be used in the embodiment of the invention illustrated in FIG. 2.

| | |
|---|---|
| Transistors 84, 85, 115, 116, 130, 131, 132, 133 | 2N414 |
| Resistors 86, 88, 140, 150, 151, 153, 154, 155, 156, 157, 158 ohms | 15K |
| Capacitors 87, 89, 160, 161, 162, 163, 164, 165 micromicrofarads | 220 |
| Resistors 91, 92, 166, 167, 168, 169, 170, 171 ohms | 3.3K |
| Battery 90 volts | 15 |
| Battery 95 do | 10 |
| Capacitors 104, 106, 107, 111, 135, 137, 146, 147, 176, 177, 178 micromicrofarads | 150 |
| Diodes 98, 99, 101, 102, 109, 110, 113, 114, 117, 136, 138, 148, 149, 177, 178 179, 180, 181, 182 | IN 198 |
| Battery 121 volts | 15 |
| Resistors 108, 112, 124, 125, 126, 127, 128, 129, 152 ohms | 6.8K |
| Resistors 93, 94, 183, 184, 185, 186, 187, 188 ohms | 33K |

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A reversible decimal counter comprising four stages, each stage including first and second elements having mutually exclusive On and Off states and each stage representing a binary "0" when said first element is Off and a binary "1" when said first element is On; means connecting said stages in a cascaded series including first selective pulse conducting means connected between the output of the first element of each stage, except the final stage of the series, and the input of a following stage, and second selective pulse conducting means connected between the output of the second element of each stage, except the final stage of the series, and the input of a following stage; first current conductive means connecting the output of the first element of the first stage to the input of the fourth stage; second current conductive means connecting the output of the first element of the fourth stage to the first selective pulse conducting means connecting said first and second stages; and third current conductive means connecting the output of the second element of the fourth stage and the inputs of the second and third stages.

2. A decimal counter for subtractive decimal counting comprising four stages, each stage including first and second elements having mutually exclusive On and Off states and each stage representing a binary "0" when said first element is Off and a binary "1" when said first element is On, said four stages being series connected by connections between the output of a second element of each stage and the input of a following stage, and a feedback path connecting the output of the second element of the fourth stage and the inputs of the second and third stages, said feedback path comprising a single amplifying means device having a current-emissive electrode, a current-receiving electrode, and a control electrode for current passing between said current-emissive and current-receiving electrodes, said control electrode being capacitively coupled to the output of the second element of the fourth stage and said current-receiving electrode being capacitively coupled to the inputs of the second and third stages.

3. A counter for additive decimal counting comprising four binary stages, each having first and second output means maintained in respectively opposite states and an input means for reversing the state thereof; means connecting said stages in a cascaded series weighted according to the normal binary system including a first selective pulse conducting means connected between the first output means of the first stage and the input means of the second stage; and means for permuting said normal binary system to the decimal system including second selective pulse conducting means connected between the first output means of the first stage and the input means of the fourth stage, means connecting the second output means of the fourth stage in biasing relationship with said second selective pulse conductive means so that said second selective pulse conductive means transmits a carry pulse between the first and fourth stages on the tenth input pulse, and means connecting the first output means of the fourth stage in biasing relationship with the first selective pulse conducting means intercoupling the first and second stages so that a carry pulse is not transmitted between said second and third stages on the tenth input pulse.

4. A counter for additive decimal counting comprising four stages, each stage including first and second elements having mutually exclusive On and Off states and each stage representing a binary "0" when said first element is Off and a binary "1" when said first element is On, means connecting said stages in a cascaded series weighted according to the normal binary system including a first amplifying device having a current-emissive electrode, a current-receiving electrode, and a control electrode for current passing between current-emissive and current-receiving electrodes, the output of the first element of the first stage being connected between the control and current-emissive electrodes of said first amplifying device, the inputs of the first and second elements of the second stage being connected between the current-emissive and current-receiving electrodes of said first amplifying device; and means for permuting said normal binary system to the decimal system comprising a second amplifying device, the output of the first element of the first stage being connected between the control and current-emissive electrodes of said second amplifying device, the input of the fourth stage being connected between the current-emissive and current-receiving electrodes of the second amplifying device, means connecting at least a portion of the output of the second element of the fourth stage between the control and current-emissive electrodes of said second amplifying device so that said second amplifying device is driven out of cutoff at the tenth input pulse, and means connecting at least a portion of the output of the first element of the fourth stage between the control and current-emissive electrodes of said first amplifying device so that said first amplifying device is not driven out of cutoff at the tenth input pulse.

5. A reversible decimal counter comprising four binary stages, each having first and second output means maintained in respectively opposite states and an input means for reversing the state thereof; a forward control line; a backward control line; means for selectively energizing said forward and backward control lines at respectively different voltage levels; a plurality of first and second amplifying devices each having a current-emissive electrode, a current-receiving electrode, and a control electrode for current passing between said current-emissive and current-receiving electrodes; said first amplifying devices respectively connecting said stages in a cascaded series weighted according to the normal binary system with their control and current-emissive electrodes connected across the first output means and their current-emissive and current-receiving electrodes connected across the input means of adjacent stages; said second amplifying devices respectively connecting said stages in a cascaded series with their control and current-emissive electrodes connected across the second output means and their current-emissive and current-receiving electrodes connected across the input means of adjacent stages; means connecting the control electrodes of each of said first amplifying devices to said forward control line; means connecting the control electrodes of each of said second amplifying devices to said backward control line, and means for permuting said normal binary system to the decimal system comprising first current conductive means connecting the first output means of the first stage to the input means of the fourth stage; second current conductive means connecting the first output means of said fourth stage to the control electrode of the first amplifying device connecting the first and second stage; and third current conductive means connecting the second output means of the fourth stage to the input means of the second and third stages.

6. A reversible decimal counter comprising four binary stages, each of said stages including first and second vacuum tubes connected in a bistable circuit with a common connection between their cathodes and the grid of each tube cross-coupled with the plate of the other tube; means connecting said stages to form a cascaded series weighted according to the normal binary system comprising first selective pulse conducting means connecting the plates of said first tubes to the grids of the first and second tubes of respective adjacent succeeding stages and second selective pulse conducting means connecting the plates of said second tubes to the grids of said first and second tubes of respective adjacent succeeding stages, means for permuting said normal binary system to the decimal system comprising first current conductive means connecting the plate of the first tube of the first stage to the input of the fourth stage; second current conductive means connecting the plate of the first tube of the fourth stage to the first selective pulse conducting means connecting said first and second stages; and third current conductive means connecting the plate of the second tube of said fourth stage to the grids of the first tubes of the second and third stages.

7. A reversible decimal counter comprising four binary stages, each of said stages including first and second transistors connected in a bistable circuit with a common connection between their emitter electrodes and the base electrode of each transistor cross-coupled with the collector electrode of the other transistor; means connecting said stages to form a cascaded series weighted according to the normal binary system comprising first selective pulse conducting means connecting the collector electrodes of said first transistors to the base electrodes of the first and second transistors of respective adjacent succeeding stages and second selective pulse conducting means connecting the collector electrodes of said second transistors to the base electrodes of said first and second transistors of respective adjacent succeeding stages; means for permuting said normal binary system to the decimal system comprising first current conductive means connecting the collector electrode of the first transistor of the first stage to the base electrode of the second electrode of the fourth stage, second current conductive means connecting the collector electrode of the first transistor of the fourth stage to the first selective pulse conducting means connecting said first and second stages, and third current conductive means connecting the collector electrode of the second transistor of the fourth stage to the base electrodes of the second transistors of the second and third stages.

8. A reversible decimal counter comprising four stages, each stage including first and second elements having mutually exclusive On and Off states and each stage representing a binary "0" when said first element is Off and a binary "1" state when said first element is On; means connecting said stages in a cascaded series weighted according to the normal binary system including first and second amplifying devices each having a current-emissive electrode, a current-receiving electrode and a control electrode for current passing between said current-emissive and current-receiving electrodes, the output of the first element of the first stage being connected between the control electrode and current-emissive electrodes of said first amplifying device, the inputs of the first and second elements of the second stage being connected between the current-emissive and current-receiving electrodes of said first amplifying device, the ouput of the second element of the first stage being connected between the control electrode and current-emissive electrodes of said second amplifying device, the inputs of the first and second elements of the second stage being connected between the current-emissive and current-receiving electrodes of said second amplifying device; and means for permuting said normal binary system to the decimal system including third and fourth amplifying devices each having a current-emissive electrode, a current-receiving electrode and a control electrode for current passing between said current-emissive and current-receiving electrodes, the output of the first element of the first stage being connected between the control and current-emissive electrodes of said third amplifying device, the input of the fourth stage being connected between the current-emissive and current-receiving electrodes of said third amplifying device, means connecting at least a portion of the output of the second element of the fourth stage between the control and current-emissive electrodes of said third amplifying device so that said third amplifying device is driven out of cutoff at the tenth input pulse, means connecting at least a portion of the output of the first element of the fourth stage between the control and current-emissive electrodes of said first amplifying device so that said first amplifying device is not driven out of cutoff at the tenth input pulse, means capacitively coupling the output of the second element of the fourth stage between the control and current-emissive electrodes of said fourth amplifying device, the inputs of the first elements of the second and third stages being connected between the current-emissive and current-receiving electrodes of the fourth amplifying device so that said second and third stages are actuated by the first input pulse during backward counting.

References Cited in the file of this patent

UNITED STATES PATENTS 2,841,705 Moerman ------------- July 1, 1958

UNITED STATES PATENT OFFICE

CERTIFICATE OF CORRECTION

Patent No. 3,054,060 September 11, 1962

Thomas H. Thomason

It is hereby certified that error appears in the above numbered patent requiring correction and that the said Letters Patent should read as corrected below.

Column 1, line 59, for "fashion as "flip-flops" "binary stages" or" read -- fashion as "flip-flops", "binary stages" or --; column 4, line 33, for "Foward" read -- Forward --; column 10, line 20, for "addition" read -- additional --.

Signed and sealed this 22nd day of January 1963.

(SEAL)
Attest:

ERNEST W. SWIDER
Attesting Officer

DAVID L. LADD
Commissioner of Patents